(12) United States Patent
Kajiyama

(10) Patent No.: US 6,578,786 B2
(45) Date of Patent: Jun. 17, 2003

(54) SEAT BELT RETRACTOR WITH LOAD ABSORBING MECHANISM

(75) Inventor: Hiroshi Kajiyama, Tokyo (JP)

(73) Assignee: Takata Corporation, Tokyo (JP)

( * ) Notice: Subject to any disclaimer, the term of this patent is extended or adjusted under 35 U.S.C. 154(b) by 0 days.

(21) Appl. No.: 09/741,140

(22) Filed: Dec. 21, 2000

(65) Prior Publication Data
US 2001/0006204 A1 Jul. 5, 2001

(30) Foreign Application Priority Data
Dec. 27, 1999 (JP) .......................... 11-369647

(51) Int. Cl.[7] ............................... B60R 22/28
(52) U.S. Cl. ..................... 242/379.1; 280/805
(58) Field of Search ............... 242/379.1; 280/805; 297/472

(56) References Cited

U.S. PATENT DOCUMENTS 4,273,361 A * 6/1981 Takei et al. ............ 280/805
5,772,144 A 6/1998 Tanabe et al. .......... 242/379.1
6,105,894 A * 8/2000 Singer et al. ........... 242/379.1

FOREIGN PATENT DOCUMENTS

JP 2000-43677 2/2000

* cited by examiner

Primary Examiner—John Q. Nguyen
(74) Attorney, Agent, or Firm—Kanesaka & Takeuchi

(57) ABSTRACT

In a seat belt retractor, as the rotation of a pawl holder of a locking member in the webbing unwinding direction is stopped by a locking mechanism in emergency, a reel receives a force on a protrusion by impact load applied to the webbing with the inertia of an occupant. As the force is increased, the protrusion is plastically deformed. By this plastic deformation, the impact on the occupant can be greatly absorbed at first. After the protrusion is sheared, the reel tends to rotate in the webbing unwinding direction by the inertia of the occupant, so that the torsion bar is further twisted. Thus, the load can be variously set to effectively absorb kinetic energy of the occupant.

10 Claims, 11 Drawing Sheets

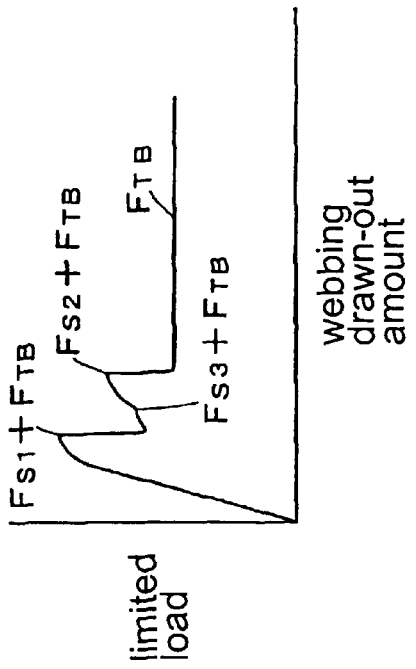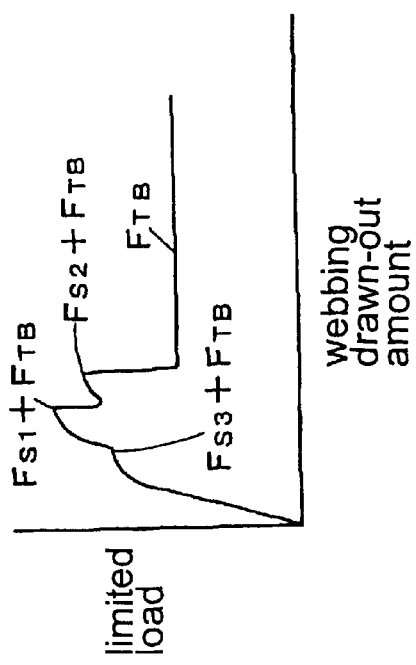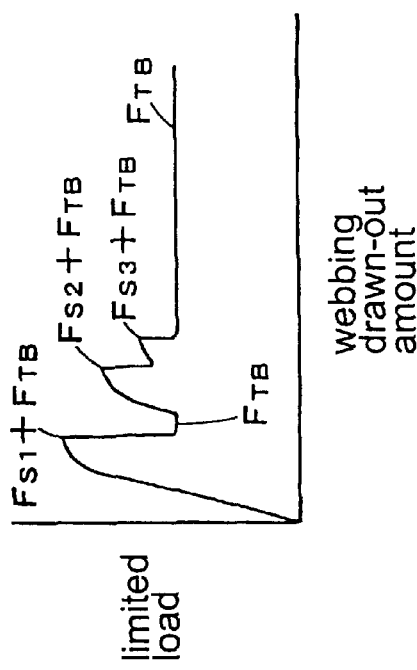

SEAT BELT RETRACTOR WITH LOAD ABSORBING MECHANISM

BACKGROUND OF THE INVENTION AND RELATED ART STATEMENT

The present invention relates to a seat belt retractor for accommodating a webbing in such a manner as to allow the webbing to be retracted and withdrawn, and more particularly, to a seat belt retractor with a torsion bar for absorbing load exerted on a webbing when an occupant wears the webbing and the webbing is stopped from being withdrawn in the event of emergency, such as a vehicle collision, at which large deceleration is exerted on the vehicle.

Conventionally, a seat belt device installed in a vehicle, such as an automobile, prevents an occupant from jumping out of a vehicle seat by restraining the occupant with a webbing or seat belt thereof, thereby protecting the occupant in the event of emergency as mentioned above.

Such seat belt device is provided with a seat belt retractor for accommodating the webbing. When the webbing is not used, the webbing is fully wound on a reel of the retractor. When an occupant wears the webbing, the webbing is withdrawn to hold the occupant on the seat. In the seat belt retractor, a locking mechanism is activated in the event of emergency as mentioned above to stop the rotation of the reel in a belt unwinding direction, thereby preventing the webbing from being withdrawn. Therefore, the webbing can securely restrain and thus protect the occupant.

However, the conventional seat belt retractor of the seat belt device has a problem. That is, when the webbing restrains and protects the occupant, a large deceleration is exerted on the vehicle, so that the occupant tends to move forward due to a large inertia force. Accordingly, a large load is exerted on the webbing, and the occupant receives a large impact load from the webbing. Though this impact load is not so severe for the occupant, it is better to absorb the impact load.

Accordingly, a seat belt retractor which has a torsion bar to absorb the load exerted on a webbing in the event of emergency when the webbing is worn has been developed.

FIG. 10 is a vertical sectional view showing an example of the conventional seat belt retractor having the aforementioned torsion bar. In the drawing, reference numeral 1 designates a seat belt retractor, reference numeral 2 designates a U-like frame, reference numeral 3 designates a webbing, reference numeral 4 designates a reel which is rotatably supported between side walls of the U-like frame 2 and on which the webbing 3 is wound, reference numeral 5 designates a deceleration sensing means which detects a large deceleration of the vehicle in case of emergency mentioned above, reference numeral 6 designates a locking mechanism which is activated by the deceleration sensing means 5 to prevent the reel 4 from rotating in the webbing unwinding or withdrawing direction, reference numeral 7 designates a torsion bar loosely fitted and inserted in the axial direction in the center of the reel 4 and rotatably connecting the reel 4 and the locking mechanism 6, reference numeral 8 designates spring means for always biasing the reel 4 in the webbing winding direction through a bush 10 by the spring force of a spiral spring 9, reference numeral 11 designates a pretensioner which is activated in the case of emergency mentioned above for producing webbing winding torque, and reference numeral 12 designates a bush for transmitting the webbing winding torque of the pretensioner 11 to the reel 4.

The locking mechanism 6 includes a pawl holder 14 which can rotate together with a first torque transmitting portion 17 described later of the torsion bar 7 and pivotally holds a pawl 13, and a lock gear 6a which rotates together with the torsion bar 7 in a normal state and stops according to the activation of the deceleration sensing means 5 to produce rotation relative to the torsion bar 7 in emergency and engages the pawl 13 with one of internal teeth 19 of the side wall of the frame 2, thereby stopping the rotation of the pawl holder 14, i.e. the rotation of the reel 4 in the webbing unwinding direction. The pawl holder 14 has an external thread portion 15. Screwed onto the external thread portion 15 is a nut-like stopper member 16 which rotates together with the reel 4.

The torsion bar 7 has the first torque transmitting portion 17 which is fitted to the pawl holder 14 for preventing the relative rotation, and a second torque transmitting portion 18 which is fitted to the reel 4 for preventing the relative rotation.

The reel 4 is always biased by the spring force of the spring means 8 in the webbing winding direction through the bush 10, the torsion bar 7, the second torque transmitting portion 18 of the torsion bar 7, and the bush 12. When the pretensioner 11 is activated, the webbing winding torque produced by the pretensioner 11 is transmitted to the reel 4 through the bush 12, whereby the reel 4 winds up the webbing 3 for a predetermined amount.

In the conventional seat belt retractor 1 having the aforementioned structure, the webbing 3 is fully wound by the biasing force of the spring means 8 when it is not used. As the webbing 3 is withdrawn at a normal speed for wearing the webbing, the reel 4 rotates in the webbing unwinding direction, so that the webbing 3 is smoothly withdrawn. After a tongue (not shown) slidably fitted to the webbing 3 is inserted into and engaged with a buckle fixed to a vehicle body, an excess amount of the webbing 3 pulled outwardly is wound onto the reel 4 by the biasing force of the spring means 8 until the webbing 3 is fitted to the occupant's body without a feeling of oppression.

In the event of emergency as mentioned above, the webbing winding torque produced by the pretensioner 11 is transmitted to the reel 4, so that the reel 4 winds up the webbing 3 for a predetermined amount, thus strongly restraining the occupant. On the other hand, the deceleration sensing means 5 is activated by large deceleration produced in the emergency to activate the locking mechanism 6. That is, the activation of the deceleration sensing means 5 prevents the rotation of the lock gear 6a in the webbing unwinding direction and then the pawl 13 of the locking mechanism 6 pivots and engages one of the internal teeth 19 of the side wall of the frame 2 so as to stop the rotation of the pawl holder 14 in the webbing unwinding direction. As a result of this, the reel 4 rotates in the webbing unwinding direction relative to the pawl holder 14 while the torsion bar 7 is twisted. From this, the reel 4 rotates in the webbing unwinding direction while twisting the torsion bar 7. By this twisting of the torsion bar 7, the load applied to the webbing 3 is limited, thus absorbing the impact on the occupant.

Since the reel 4 rotates relative to the pawl holder 14, the stopper member 16 rotates relative to the external thread portion 15 which is screwed into the stopper member 16, whereby the stopper member 16 moves toward the pawl holder 14. As the stopper member 16 comes to contact the pawl holder 14, the stopper member 16 is prevented from further rotating, so that the reel 4 is also prevented from rotating and the torsion bar 7 is prevented from being twisted. In this manner, the withdrawal of the webbing 3 is stopped, whereby the occupant is restrained by the webbing 3 securely, and the maximum allowable twisting deformation of the torsion bar 7 is defined, thereby preventing the torsion bar 7 from being broken by further twisting.

In addition, in this conventional seat belt retractor 1, the pawl holder 14 of the locking mechanism 6 rotates in the webbing unwinding direction relative to the lock gear 6a when the webbing is rapidly withdrawn. Also in this case, the pawl 13 of the locking mechanism 6 engages one of the internal teeth 19 of the side wall of the frame 2 so as to stop the rotation of the pawl holder 14 in the same manner as mentioned above. Therefore, the reel 4 is prevented from rotating in the unwinding direction through the torsion bar 7, thus stopping the withdrawal of the webbing.

By the way, in this conventional seat belt retractor 1, the limited load is defined only by the torsion bar 7, and kinetic energy of the occupant can be absorbed just by the one limited load. However, the magnitude of the produced kinetic energy varies depending on the condition including the type of vehicle and the occupant's body size. By the aforementioned structure in which the kinetic energy is absorbed just by the one limited load, however, it is difficult to suitably and effectively comply with the various conditions of the kinetic energy by controlling the limited load corresponding to the condition of the kinetic energy.

The present invention has been made under the aforementioned circumstances, and the object of the present invention is to provide a seat belt retractor, wherein limited load can be variously set to effectively absorb kinetic energy of an occupant.

SUMMARY OF THE INVENTION

To solve the aforementioned problems, a seat belt retractor of the first aspect comprises, at least, a reel for winding up a webbing; locking means having a locking member, rotation of the locking member in the webbing unwinding direction being stopped in the event of emergency; and webbing load limiting means rotationally connecting the reel and the locking member and at least having a portion disposed within the reel coaxially with the reel. The webbing load limiting means limits load exerted on the webbing when the rotation of the locking member is stopped in the webbing unwinding direction and the reel rotates for a predetermined amount in the webbing unwinding direction relative to the locking member. The webbing load limiting means includes a ring-like shear plate disposed between the reel and the locking member. The shear plate has a circumferential shearing portion extending in the circumferential direction. The circumferential shearing portion prevents the reel from rotation relative to the locking member when exerted shearing load is less than a preset shearing load, and is plastically deformed and sheared to allow the reel to rotate relative to the locking member when the exerted shearing load exceeds the preset shearing load, in a period between the time when the rotation of the locking member is stopped in the webbing unwinding direction and the time when the rotation of the reel is stopped in the webbing unwinding direction relative to the locking member.

A seat belt retractor of the second aspect comprises, at least, a reel for winding up a webbing; locking means having a locking member, rotation of which in the webbing unwinding direction is stopped in the event of emergency; and webbing load limiting means rotationally connecting the reel and the locking member and at least having a portion disposed within the reel coaxially with the reel. The webbing load limiting means limits load exerted on the webbing when the rotation of the locking member in the webbing unwinding direction is stopped and the reel rotates for a predetermined amount in the webbing unwinding direction relative to the locking member. The webbing load limiting means includes a shear member disposed between the reel and the locking member. The shear member has a predetermined number of circumferential shearing portions extending in the circumferential direction at predetermined intervals. The circumferential shearing portions prevent the reel from rotation relative to the locking member when exerted shearing load is less than any one of respective preset shearing loads, and are plastically deformed and sheared to allow the reel to rotate relative to the locking member when the exerted shearing load exceeds the respective preset shearing loads, in a period between the time when the locking member is stopped from rotation in the webbing unwinding direction and the time when the reel is stopped from rotation in the webbing unwinding direction relative to the locking member.

In the seat belt retractor of the third aspect, the circumferential shearing portions are sequentially sheared in such a manner that first some of the circumferential shearing portions are sheared to rotate the reel relative to the locking member and, after that, some of the remainder of the circumferential shearing portions are sheared.

In the seat belt retractor of the fourth aspect, the respective preset shearing loads of the circumferential shearing portions are set to be different from each other or to be equal to each other, or set such that some of these are equal to each other.

In the seat belt retractor of the fifth aspect, the shear member is composed of a ring-like shear plate.

In the seat belt retractor of the sixth aspect, the ring-like shear plate comprises at least one arcuate outward or outer protrusion which is formed around the outer periphery thereof to protrude in the radial direction and extend in the circumferential direction, and at least one arcuate inward or inner protrusion which is formed around the inner periphery thereof to protrude in the radial direction and extend in the circumferential direction. The reel is formed with a recess in which one of the arcuate outward protrusion and the arcuate inward protrusion is fitted and which is engageable with the one in the webbing unwinding direction. The locking member is fitted in the other of the arcuate outward protrusion and the arcuate inward protrusion and is engageable to the other in the webbing unwinding direction. The circumferential shearing portion is composed of the arcuate outward protrusion or the arcuate inward protrusion.

The seat belt retractor having the aforementioned structure according to the first aspect has limited load characteristics providing two kinds of limited loads, i.e. the limited load by the circumferential shearing portion of the shear plate and the limit load by the webbing load limiting means. Accordingly, the seat belt retractor of the first aspect can effectively absorb impact load exerted on a vehicle occupant as compared to the conventional seat belt retractor having limited load characteristics providing one kind of flat limited load. Especially, the respective timings of two kinds of limited loads can be freely set such that the action of the circumferential shearing portion is conducted in a period between the time when the locking member is stopped in its rotation in the webbing unwinding direction and the time when the reel is stopped in its rotation in the webbing unwinding direction relative to the locking member.

In addition, the seat belt retractor of the second aspect has multi-stage limited load characteristics providing plural kinds of limited loads, i.e. the limited loads by the predetermined number of circumferential shearing portions of the shear member and the limit load by the webbing load limiting means. Accordingly, the seat belt retractor of the second aspect can effectively absorb impact load exerted on the vehicle occupant as compared to the conventional seat belt retractor having limited load characteristics providing one kind of flat limited load. Especially, the respective timings of various kinds of limited loads can be freely set such that the actions of the predetermined number of circumferential shearing portions are conducted in a period between the time when the locking member is stopped in its rotation in the webbing unwinding direction and the time when the reel is stopped in its rotation in the webbing unwinding direction relative to the locking member.

In the invention, the above effects can be obtained just by interposing a ring-like shear plate which can be easily configured and processed between the reel and the locking member. Therefore, the assembly is easy and the cost is low.

BRIEF DESCRIPTION OF THE DRAWINGS

FIGS. 4(a) and 4(b) are views for explaining the operation between the reel and the shear plate, wherein FIG. 4(a) is a view showing a state before inner protrusions forming a circumferential shearing portion of the shear plate are not sheared and FIG. 4(b) is a view showing a state after the circumferential shearing portion is sheared;

FIGS. 5(a)–5(g) show limited load characteristics of the seat belt retractor according to the present invention, each graph showing each different example of limited load characteristics;

FIGS. 7(a)—7(c) are views for explaining the operation between the reel and the shear plate, wherein FIG. 7(a) is a view showing a state before all arcuate inner protrusions forming a circumferential shearing portion of the shear plate are not sheared, FIG. 7(b) is a view showing a state after one of the arcuate inner protrusions is sheared, and FIG. 7(c) is a view showing a state after another one of the arcuate inner protrusions is sheared;

DETAILED DESCRIPTION OF PREFERRED EMBODIMENTS

Hereinafter, embodiments of the present invention will be described with reference to the attached drawings.

Figure 1:
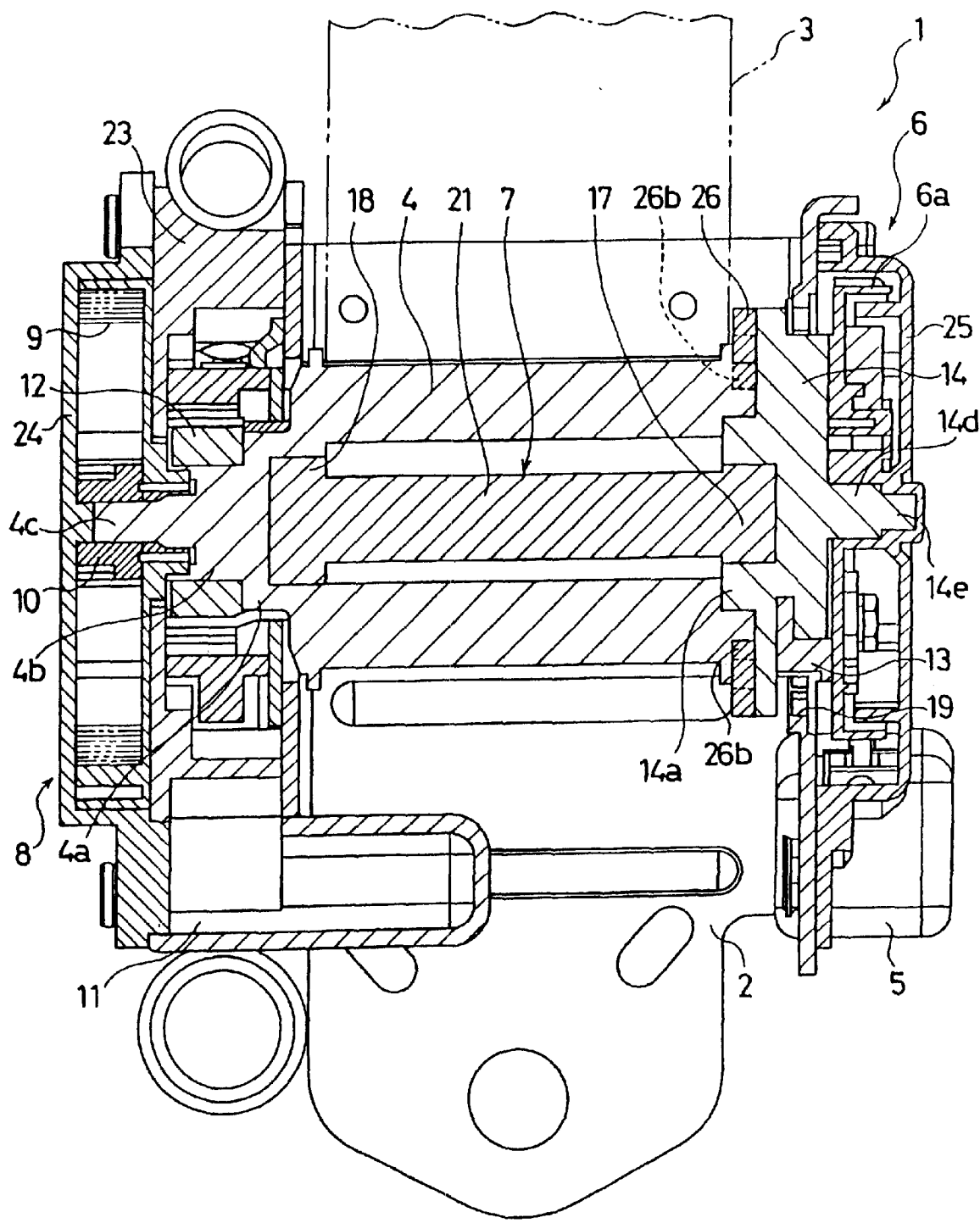
FIG. 1 is a sectional view showing an embodiment of the seat belt retractor according to the present invention.
Figure 10:
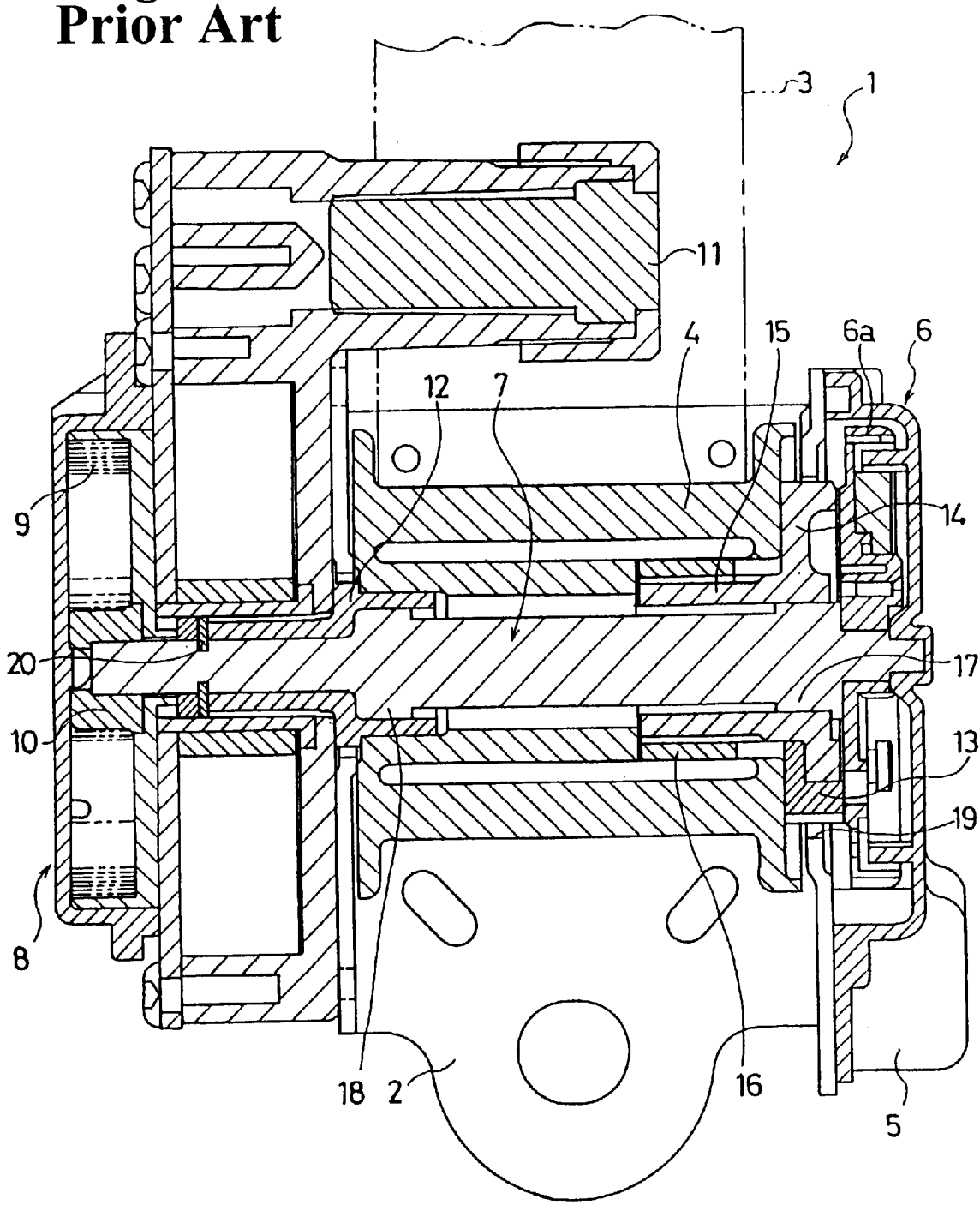
FIG. 10 is a vertical sectional view showing an example of a seat belt retractor with a conventional torsion bar.

FIG. 1 is a sectional view, similar to FIG. 10, showing an embodiment of the seat belt retractor according to the present invention. Parts of the following embodiments similar or corresponding to the parts of the conventional seat belt retractor shown in FIG. 10 will be marked by the same reference numerals and the detail description of the parts will be omitted. In the following description, "the right and the left" mean the right and the left in drawings.

As shown in FIG. 1, in the seat belt retractor 1 of this embodiment, a reel 4 is provided at spring means 8 side, with a stepped extension shaft which is formed coaxially with a webbing winding portion thereof. The stepped extension shaft of the reel 4 comprises a first extension shaft 4a rotatably supported by a frame 2, a second extension shaft 4b having a diameter smaller than that of the first extension shaft 4a, and a third extension shaft 4c having a diameter smaller than that of the second extension shaft 4b.

The first extension shaft 4a is rotatably supported by the frame 2 while the third extension shaft 4c is fitted in a bush 10 of the spring means 8 in such a manner that the third extension shaft 4c can rotate together with the bush 10. The second extension shaft 4b penetrates a bush 12 for transmitting webbing winding torque of the pretensioner 11 to the reel 4, whereby the second extension shaft 4b and the bush 12 rotate together.

The torsion bar 7 composes a webbing load limiting means of the present invention, and comprises first and second torque transmitting portions 17, 18, and a torsion portion 21 which is disposed between the first and second torque transmitting portions 17 and 18 to absorb impact energy when twisted, thereby limiting the load exerted on the webbing 3. The torsion bar 7 is inserted into the reel 4 from the right in FIG. 1 until the second torque transmitting portion 18 is fitted in the reel 4, so that the torsion bar 7 is connected to the reel 4 in such a manner as to rotate together with the reel 4.

On the other hand, the first torque transmitting portion 17 is fitted in a pawl holder 14 corresponding to the locking member of the present invention in such a manner that the torsion bar 7 can rotate together with the pawl holder 14. In addition, the left end portion 14a of the pawl holder 14 is fitted in the reel 4 without looseness in the radial direction in such a manner that the pawl holder 14 can rotate relative to the reel 4 for a predetermined angle, and the left end portion 14a contacts the right end of the reel 4. At this point, the torsion bar 7 and the pawl holder 14 are arranged coaxially with the reel 4.

The pawl holder 14 has a stepped extension shaft formed coaxially with the webbing winding portion of the reel 4. The stepped extension shaft of the pawl holder 14 comprises a first extension shaft 14d for rotatably supporting a lock gear 6a of a locking mechanism 6, and a second extension shaft 14e rotatably supported by a cover 25 of the locking mechanism 6 and having a diameter smaller than that of the first extension shaft 14d.

In the seat belt retractor 1 of this embodiment, the external thread portion 15 formed in the pawl holder 14 and the stopper member 16 into which the external thread portion 15 is screwed in the aforementioned conventional seat belt retractor 1 are not employed. Instead of this, the reel 4 can rotate relative to the pawl holder 14 for the predetermined angle in the webbing unwinding direction and, after that, the reel 4 is prevented from further rotation relative to the pawl holder 14, thereby preventing the torsion bar 7 from being broken by further twisting.

Figure 2:
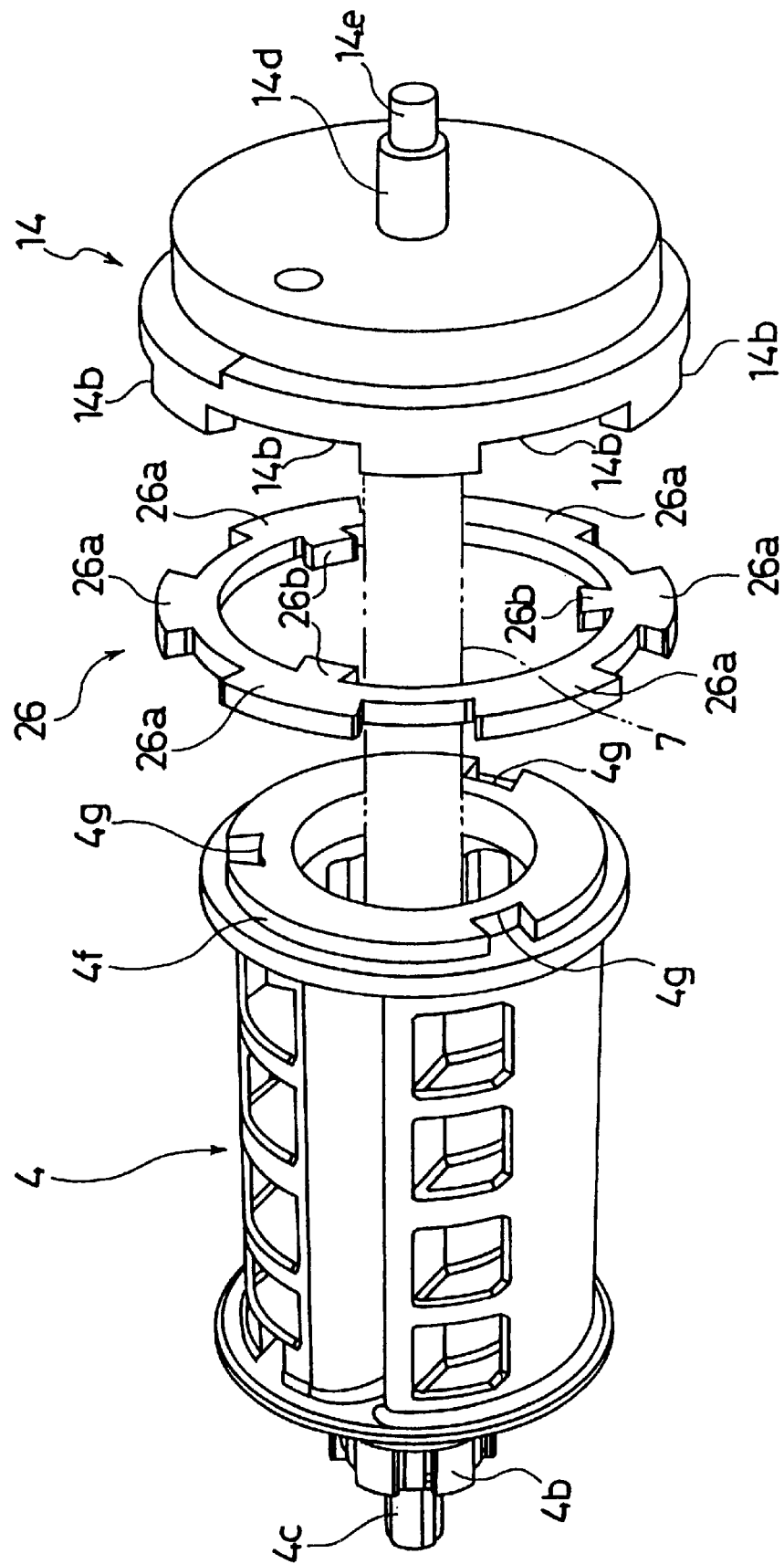
FIG. 2 is an exploded perspective view showing a reel, a torsion bar, a pawl holder, and a shear plate, as parts of the seat belt retractor of the embodiment shown in FIG. 1.
Figure 3:
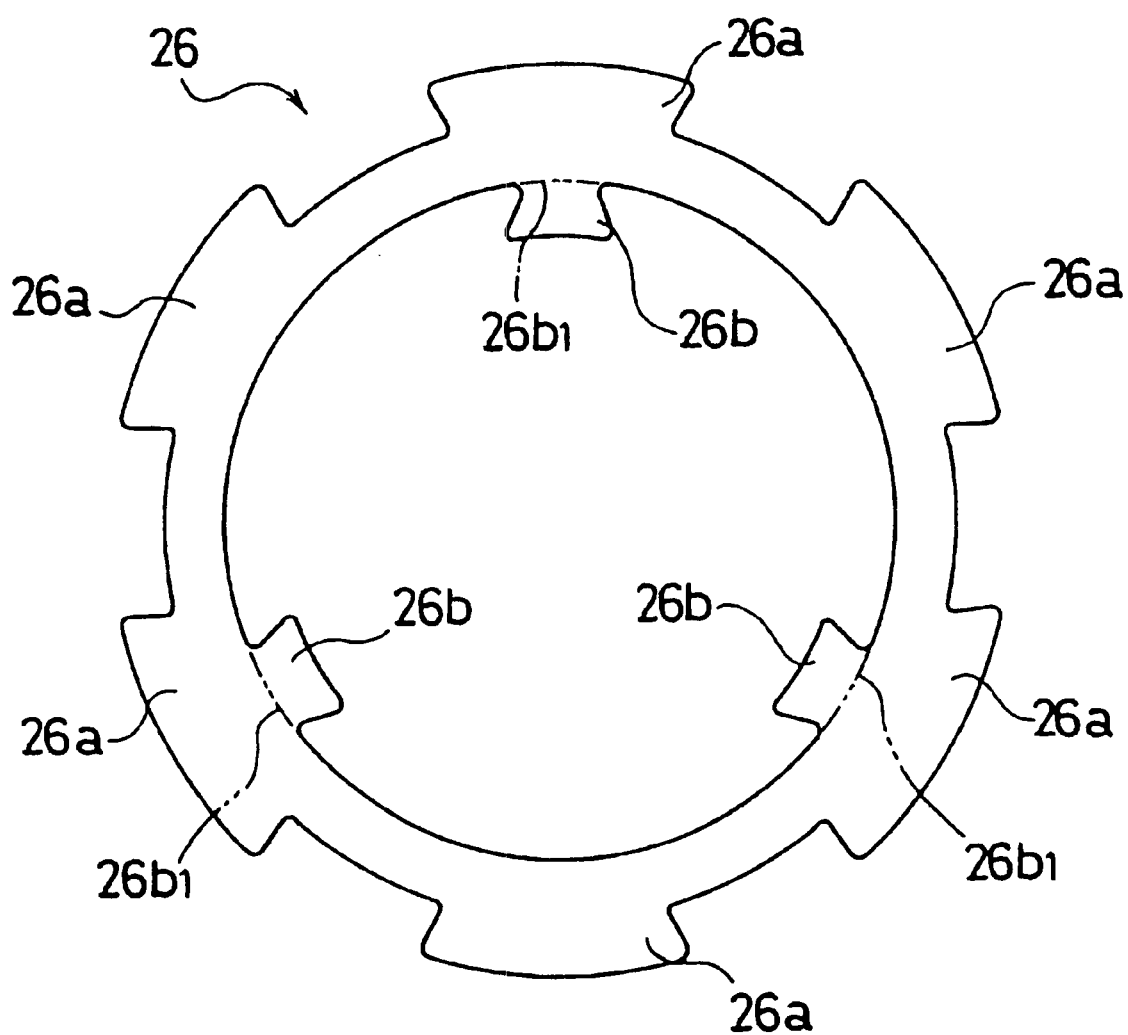
FIG. 3 is a view showing an embodiment of the shear plate employed in the seat belt retractor of the embodiment shown in FIG. 1.

Disposed between the right end of the reel 4 and the pawl holder 14 is a shear plate 26 as the shear member of the present invention. As shown in FIG. 2 and FIG. 3, the shear plate 26 is formed in a ring shape and has a predetermined number of (six in the illustrated example) arcuate outward protrusions 26a of the same size which are formed around the outer periphery thereof at equal intervals in the circumferential direction, each protruding in the radial direction and extending in the circumferential direction. The shear plate 26 is formed with a predetermined number of (three in the illustrated example) arcuate inward protrusions 26b of the same size which are formed around the inner periphery thereof at equal intervals in the circumferential direction, each protruding in the radial direction and extending in the circumferential direction. The arcuate inward protrusion 26b is narrow at the root 26b1, i.e. a position shown by two-dot chain lines along the inner periphery of the shear plate 26, 50 that the circumferential length of the root 26b1 is shorter than that of the end thereof. Each of the arcuate inward protrusions 26b is adapted to be sheared in the circumferential direction substantially along the two-dot chain lines when force exceeding the shearing load thereof (in this example, the respective shearing loads of the arcuate inward protrusions 26b are the same) is exerted on the arcuate inward protrusions 26b in the circumferential direction. That is, the arcuate inward protrusions 26b form a circumferential shearing portion of the present invention.

The total force of the shearing loads of the arcuate inward protrusions 26b is the limited load FS of the circumferential shearing portion of this embodiment. The limited load FS is set to be greater than the limited load FTB of the torsion bar 7.

On the other hand, the pawl holder 14 has arcuate recesses 14b formed at a side thereof facing the shear plate 26 in such a manner that the arcuate outward protrusions 26a of the shear plate 26 can be fitted in the arcuate recesses 14b in the axial direction, the number of the arcuate recesses 14b being the same as that of the arcuate outward protrusions 26a (in FIG. 2, only four arcuate recesses 14b are shown). In the state that the arcuate outward protrusions 26a are fitted in the arcuate recesses 14b in the axial direction, the arcuate outward protrusions 26a are engaged with the arcuate recesses 14b in the rotational direction whereby the pawl holder 14 and the shear plate 26 always rotate together.

The reel 4 has a ring-like shaft portion 4f which is formed on a side facing the shearing plate 26 and is fitted in the shear plate 26 slidably and rotatably relative to the inner periphery of the shear plate 26. The ring-like shaft portion 4f has arcuate recesses 4g at equal intervals in the circumferential direction in such a manner that the arcuate inward protrusions 26b of the shear plate 26 can be fitted in the arcuate recesses 4g in the axial direction, the number of the arcuate recesses 4g being the same as that of the arcuate inward protrusions 26b. In the state that the arcuate inward protrusions 26b are fitted in the arcuate recesses 4g in the axial direction, the arcuate inward protrusions 26b are engaged with the arcuate recesses 4g in the rotational direction. When the force exerted on the arcuate inward protrusions 26b in the circumferential direction exceeds the shearing load, the arcuate inward protrusions 26b are sheared in the circumferential direction.

The shear plate 26 having the aforementioned structure is assembled between the reel 4 and the pawl holder 14 as shown in FIG. 1 such that the arcuate outward protrusions 26a are fitted in the arcuate recesses 14b and the arcuate inward protrusions 26b are fitted in the arcuate recesses 4g. Until the total or resultant force exerted by the reel 4 to the arcuate inward protrusions 26b in the circumferential direction exceeds the limited load FS of the circumferential shearing portion, the arcuate inward protrusions 26b are not sheared so that the reel 4, the pawl holder 14, and the shearing plate 26 rotate together. Once the resultant force exerted by the reel to the arcuate inward protrusions 26b exceeds the limited load FS of the circumferential shearing portion, the arcuate inward protrusions 26b are sheared, so that the reel 4 rotates relative to the pawl holder 14 and the shearing plate 26.

The other structures and operations of the seat belt retractor 1 of this embodiment are the same as those of the conventional one.

Hereinafter, description will be made as regard to the operation of the seat belt retractor 1 of this embodiment having the aforementioned structure when the locking mechanism 6 is actuated in the event of emergency.

The belt winding torque produced by the pretensioner 11 in the event of emergency is transmitted to the reel 4 so that the reel 4 winds up the webbing 3 for a predetermined amount, thus strongly restraining an occupant. On the other hand, the deceleration sensing means 5 is activated by large deceleration of the vehicle produced in the emergency to activate the locking mechanism 6. That is, the rotation of the lock gear 6a in the webbing unwinding direction is stopped by the actuation of the deceleration sensing means 5, and since the pawl holder 14 continuously rotates in the webbing unwinding direction, the pawl 13 of the locking mechanism 6 pivots and engages one of internal teeth 19 of the side wall of the frame 2 so as to stop the rotation of the pawl holder 14 in the webbing unwinding direction. Though the above action of the seat belt retractor 1 of this embodiment is the same as that of the conventional seat belt retractor 1 shown in FIG. 10, the following operations are different from those of the conventional seat belt retractor 1.

Figure 4A:
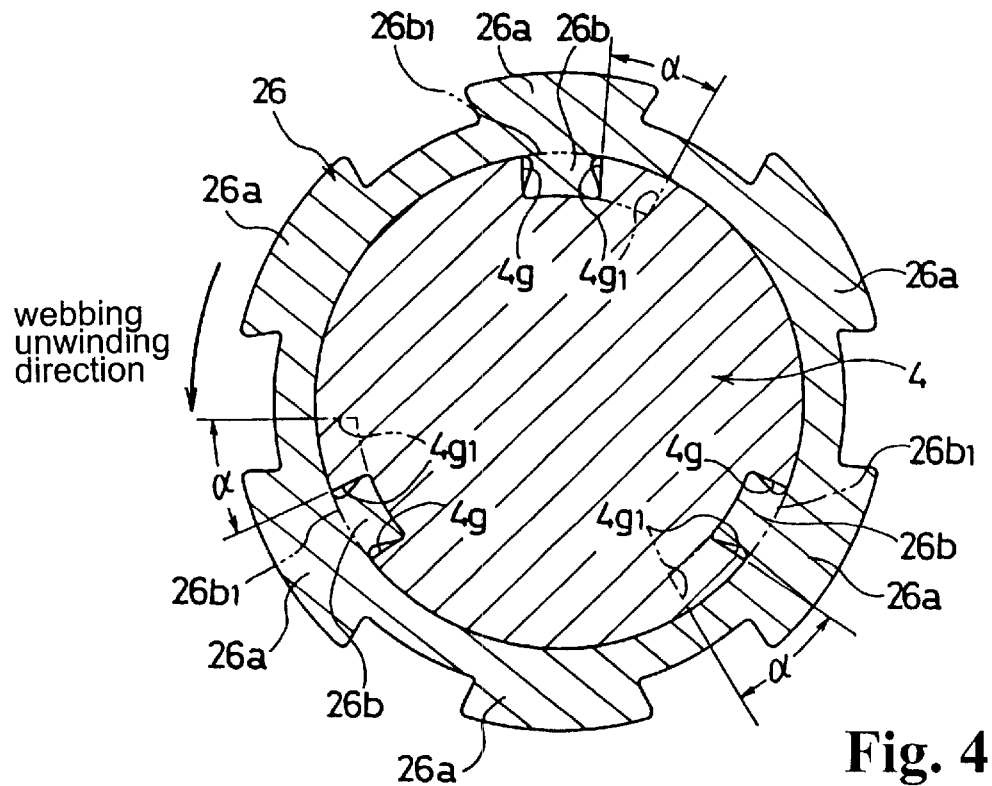
Figure 5B:
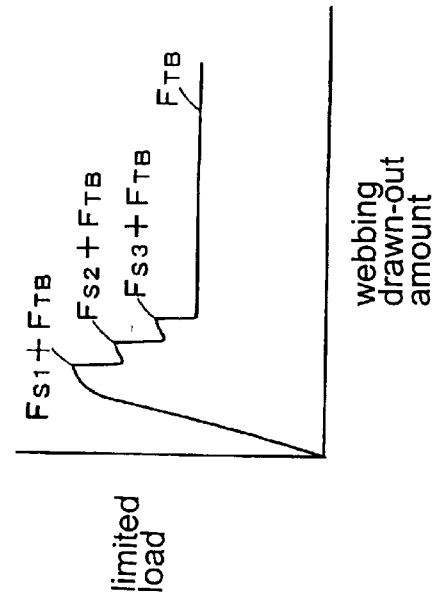
Figure 5D:
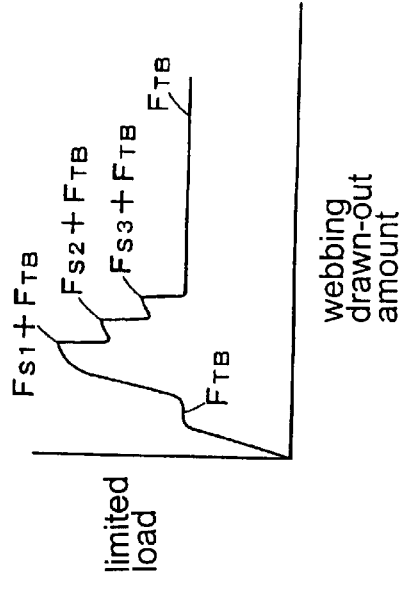
Figure 5A:
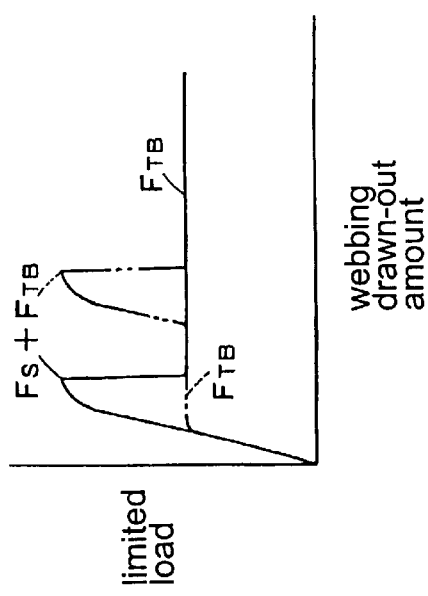
Figure 5C:
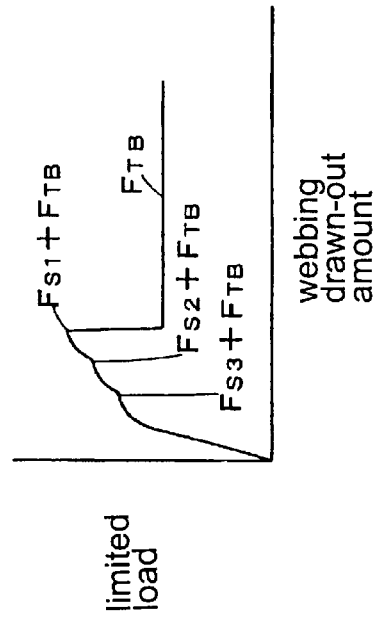

That is, in the seat belt retractor 1 of this embodiment, as shown in FIG. 4(a), the arcuate inward protrusions 26b of the shear plate 26 are fitted in the arcuate recesses 4g of the reel 4, so that the respective side walls 4g1 of the arcuate recesses 4g contact the arcuate inward protrusions 26b in the webbing unwinding direction, whereby the reel 4 and the pawl holder 14 are engaged with each other just like an integral part via the shear plate 26, thereby preventing the rotation of the reel 4 in the webbing unwinding direction. An impact load is exerted on the webbing 3 by inertia of the occupant and the impact load is rapidly increased as shown in FIG. 5(a). A force is exerted on the reel 4 in the webbing unwinding direction by this impact load and this force acts on the respective arcuate inward protrusions 26b.

As the force in the webbing unwinding direction is exerted by the reel 4 to the respective arcuate inward protrusions 26b, the roots 26b1 are gradually plastically deformed. By this plastic deformation, the reel 4 rotates in the webbing unwinding direction relative to the shear plate 26, so that the torsion bar 7 starts to be twisted. As the force exerted on the respective inward protrusions 26b exceeds the limited load Fs of the circumferential shearing portion, all of the arcuate inward protrusions 26b are sheared at their roots 26b1. At this point, the limited load reaches its peak and is equal to the sum of the limited load FS of the circumferential shearing portion and the limited load FTB of the torsion bar 7.

By the shearing of the circumferential shearing portion, the impact applied to the occupant is greatly absorbed at first. During this operation, the arcuate outward protrusions 26a are not sheared because the size of the arcuate outward protrusions 26a is larger than that of the arcuate inward protrusions 26b and the number of the arcuate outward protrusions 26a is also greater than that of the arcuate inward protrusions 26b.

Figure 4B:
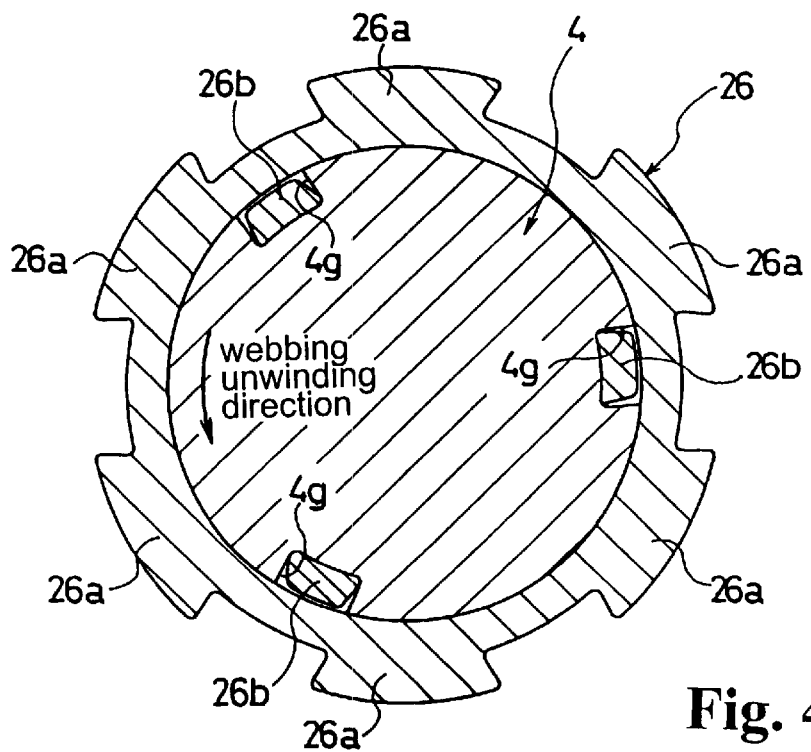

After the arcuate inward protrusions 26b are sheared, the reel 4 is further rotated in the webbing unwinding direction due to the inertia of the occupant. Thus, the torsion bar 7 is further twisted, so that the reel 4 rotates in the webbing unwinding direction relative to the shear plate 26 and the pawl holder 14 as shown in FIG. 4(b). At this point, the limited load is rapidly decreased from the aforementioned peak to the limited load FTB of the torsion bar 7 as shown in FIG. 5(a). After this, the reel 4 rotates in the webbing unwinding direction with twisting of the torsion bar 7. By this twisting of the torsion bar 7, the load applied to the webbing 3 is limited, thus gently absorbing the impact on the occupant. Thus, the limited load becomes equal to the limited load FTB of the torsion bar 7 and becomes substantial constant.

As mentioned above, the seat belt retractor 1 of this embodiment has limited load characteristics capable of providing two kinds of limited loads. Namely, the relatively large limited load FS is provided in the initial stage by the circumferential shearing portion and the relatively small and substantial constant limited load FTB is provided by the torsion bar 7. According to the limited load characteristics, the impact energy on the occupant can be absorbed by the large limited load FS+FTB in the initial stage, and then the impact energy on the occupant can be gently absorbed by the small limited load FTB, thereby further effectively absorbing the impact energy as compared to the conventional one.

The other functions of the seat belt retractor 1 of this embodiment are the same as those of the conventional seat belt retractor mentioned above with reference to FIG. 10.

According to the limited load characteristics having two stages providing two kinds of limited loads, the seat belt retractor 1 of this embodiment can greatly absorb the impact energy on the occupant in the initial stage and then gently absorb the impact energy, thereby further effectively absorbing the impact energy as compared to the conventional case with the limit load only by the torsion bar 7.

The arcuate recesses 4g of the reel 4 may have longer length in the circumferential direction as shown by two-dot chain lines in FIG. 4(a). According to this structure, when the pawl holder 14 is stopped in its rotation in the webbing unwinding direction, the reel 4 first rotates at some extent relative to the pawl holder 14 and the shearing plate 26, so that the torsion bar 7 is twisted at first. After that, the side walls 4g1 of the arcuate recesses 4g of the reel contact the arcuate inward protrusions 26b of the shear plate 26, so that the arcuate inward protrusions 26b are sheared. In this manner, the peak of the limited load characteristics can be shifted to be set at a middle portion in the substantial constant limited load FTB as shown by two-dot line in FIG. 5(a). In this case, by suitably setting the distance, i.e. the distance of rotational movement until the side walls of the arcuate recesses 4g come to contact the arcuate inward protrusions 26b, the position of the peak, i.e. timing of the start of shearing of the arcuate inward protrusions 26b can be set at a desired timing. Therefore, the impact load to the occupant can be further effectively absorbed.

The other effects of the seat belt retractor 1 of this embodiment are the same as those of the conventional seat belt retractor described above with reference to FIG. 10.

Figure 6:
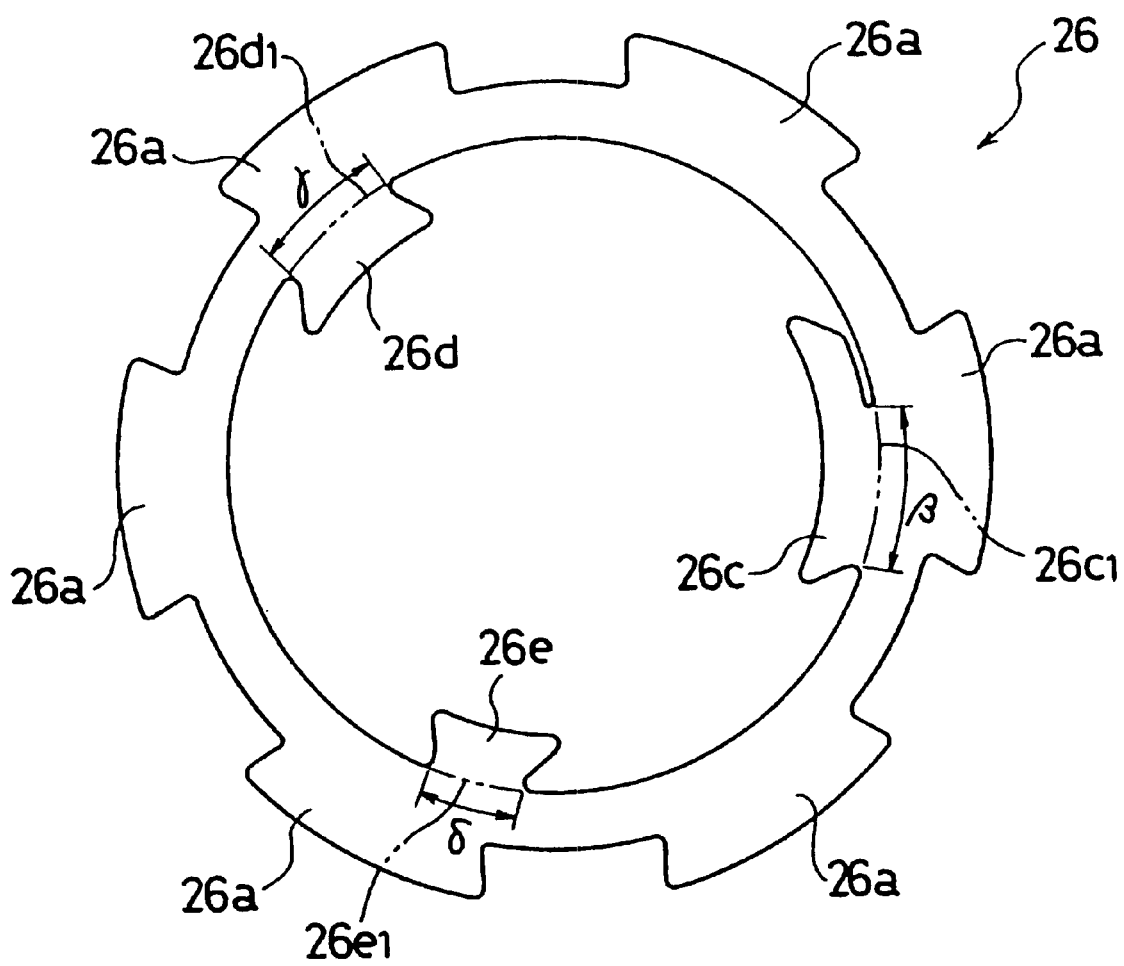
FIG. 6 is a view showing another embodiment of the shear plate employed in the seat belt retractor shown in FIG. 1.

FIG. 6 is a view similar to FIG. 3, showing a shear plate employed in a seat belt retractor of another embodiment of the present invention.

Though the arcuate inward protrusions 26b of the shear plate 26 of the aforementioned embodiment are formed to have the same size so that the respective limited loads FS of the arcuate inward protrusions 26b are set to be equal, a shear plate 26' of this embodiment has arcuate inward protrusions 26c, 26d, 26e having sizes different from each other as shown in FIG. 6. That is, the circumferential lengths of the respective roots 26c1, 26d1, 26e1 of the arcuate inward protrusions 26c, 26d, 26e are set as the circumferential length β of the root 26c1>the circumferential length γ of the root 26d1>the circumferential length δ of the root 26e1. Accordingly, the respective limited loads FS1, FS2, FS3 of the arcuate inward protrusions 26c, 26d, 26e are set as FS1>FS2>FS3.

Figure 7A:
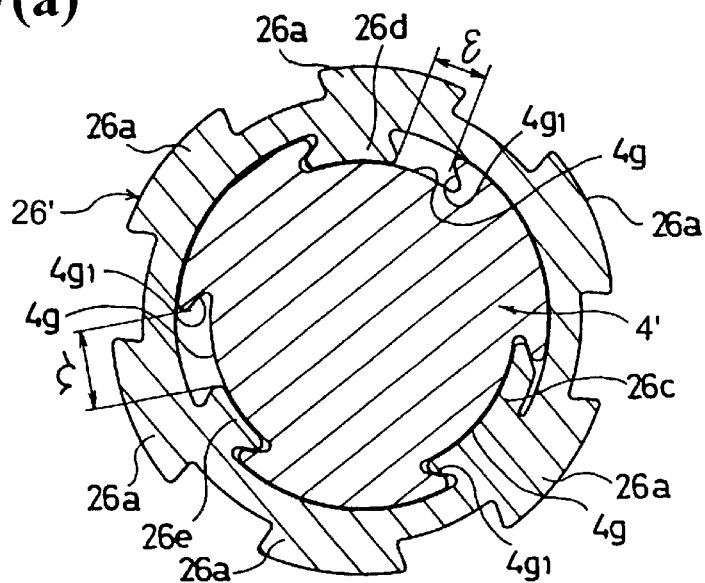

On the other hand, arcuate recesses 4g are formed in the reel 4' at equal intervals in the circumferential direction and have the same sizes as shown in FIG. 7(a) just like the aforementioned embodiment. In this case, in the state that the arcuate inward protrusions 26c, 26d, 26e are fitted in the arcuate recesses 4g, a side wall 4g1 of one of the arcuate recesses 4g contacts the arcuate inward protrusion 26c in the webbing unwinding direction while the side walls 4g1 of the other arcuate recesses 4g are spaced apart from the arcuate inward protrusions 26d, 26e, i.e. not contact the arcuate inward protrusions 26d, 26e in the webbing unwinding direction. The distance ζ between the side wall 4g1 of the arcuate recess 4g and the arcuate inward protrusion 26e is set to be larger than the distance ε between the side wall 4g1 of the arcuate recess 4g and the arcuate inward protrusion 26d (ζ>ε). The distance ε is set so that the side wall 4g1 of the arcuate recess 4g comes to contact the arcuate inward protrusion 26d in the webbing unwinding direction at substantially the same time of the shearing of the arcuate inward protrusion 26c. The distance ζ is set so that the side wall 4g1 of the arcuate recess 4g comes to contact the arcuate inward protrusion 26e in the webbing unwinding direction at substantially the same time of the shearing of the arcuate inward protrusion 26d.

The other structures of the seat belt retractor of this embodiment are the same as those of the seat belt retractor of the aforementioned embodiment.

Hereinafter, description will be made as regard to the operations of the seat belt retractor 1 of this embodiment having the aforementioned structure when the locking mechanism 6 is actuated in the event of emergency.

The operations of the seat belt retractor of this embodiment until the pawl 13 of the locking mechanism 6 pivots and engages one of internal teeth 19 of the side wall of the frame 2 in the event of emergency so as to stop the rotation of the pawl holder 14 in the webbing unwinding direction are the same as those of the seat belt retractor 1 of the aforementioned embodiment.

In the seat belt retractor 1 of this embodiment, after the rotation of the pawl holder 14 is stopped, only the side wall 4g1 of the arcuate recess 4g of the reel 4 contacts the arcuate inward protrusion 26c of the shear plate 26 in the webbing unwinding direction, whereby the reel 4 and the pawl holder 14 are engaged with each other just like an integral part via the shear plate 26, thereby preventing the rotation of the reel 4 in the webbing unwinding direction. Just like the aforementioned embodiment, an impact load exerted on the webbing 3 by inertia of the occupant is rapidly increased as shown in FIG. 5(b). A force is exerted on the reel 4 in the webbing unwinding direction by this impact load and this force acts on the arcuate inward protrusion 26c only.

As the force in the webbing unwinding direction is applied by the reel 4 to the arcuate inward protrusion 26c only, the root 26c1 of the arcuate inward protrusion 26c is gradually plastically deformed. By this plastic deformation, the reel 4' rotates in the webbing unwinding direction relative to the shear plate 26, so that the torsion bar 7 starts to be twisted. As the force exerted on the arcuate inward protrusion 26c exceeds the limited load Fs1 of the arcuate inward protrusion 26c, the arcuate inward protrusion 26c is sheared at its root 26c1. At this point, the limited load reaches its peak and is equal to the sum of the limited load FS1 of the arcuate inward protrusion 26c and the limited load FTB of the torsion bar 7. By the shearing of the arcuate inward protrusion 26c, the impact applied to the occupant is greatly absorbed at first.

Figure 7B:
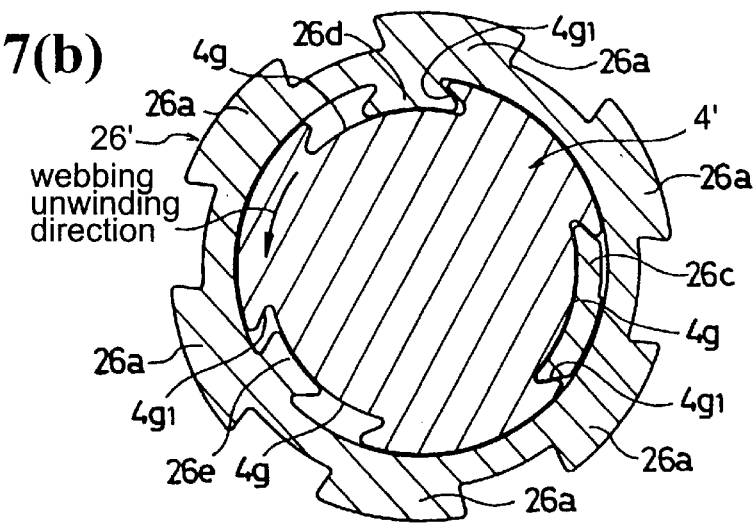
Figure 7C:
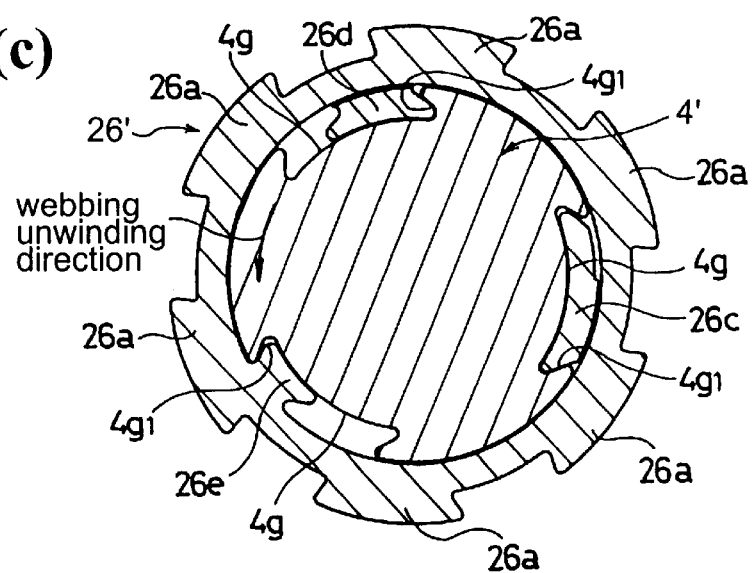

After the arcuate inward protrusion 26c is sheared, the limited load is rapidly decreased from the aforementioned peak as shown in FIG. 5(*b*). However, the side wall 4g1 of the arcuate recess 4g comes to contact the arcuate inward protrusion 26d at substantially the same time of the shearing of the arcuate inward protrusion 26c as shown in FIG. 7(*b*), whereby the reel 4' and the shear plate 26 are engaged with each other just like an integral part via only the arcuate inward protrusion 26d in the webbing unwinding direction. Therefore, the force exerted on the reel 4' in the webbing unwinding direction by this impact load acts on the arcuate inward protrusion 26d, so that the entire limited load of the seat belt retractor never becomes lower than the limited load FS2 of the arcuate inward protrusion 26d. At this point, the side wall 4g1 of the arcuate recess 4g does not still contact the arcuate inward protrusion 26e in the webbing unwinding direction, so that the force from the reel 4' acts on the arcuate inward protrusion 26d only.

As the force in the webbing unwinding direction is applied by the reel 4' to the arcuate inward protrusion 26d only, the root 26d1 of the arcuate inward protrusion 26d is gradually plastically deformed. By this plastic deformation, the reel 4' rotates in the webbing unwinding direction relative to the shear plate 26', so that the torsion bar 7 is further twisted. As the force exerted on the arcuate inward protrusion 26d exceeds the limited load Fs2 of the arcuate inward protrusion 26d, the arcuate inward protrusion 26d is sheared at its root 26d1. At this point, the entire limited load reaches the sum of the limited load FS2 of the arcuate inward protrusion 26d and the limited load FTB of the torsion bar 7. By the shearing of the arcuate inward protrusion 26d, the impact applied to the occupant is absorbed, followed by the absorption by the shearing of the arcuate inward protrusion 26c, the absorbing amount being smaller than the absorbing amount by the arcuate inward protrusion 26c.

After the arcuate inward protrusion 26d is sheared, the limited load is rapidly decreased from the limited load FS2+FTB as shown in FIG. 5(*b*). However, the side wall 4g1 of the arcuate recess 4g comes to contact the arcuate inward protrusion 26e at substantially the same time of the shearing of the arcuate inward protrusion 26d as shown in FIG. 7(*c*), whereby the reel 4' and the shear plate 26 are engaged with each other just like an integral part via only the arcuate inward protrusion 26e in the webbing unwinding direction. Therefore, the force exerted on the reel 4' in the webbing unwinding direction by this impact load acts on the arcuate inward protrusion 26e, so that the entire limited load of the seat belt retractor never becomes lower than the limited load FS3 of the arcuate inward protrusion 26e.

As the force in the webbing unwinding direction is applied by the reel 4' to the arcuate inward protrusion 26e only, the root of the arcuate inward protrusion 26e is gradually plastically deformed. By this plastic deformation, the reel 4' rotates in the webbing unwinding direction relative to the shear plate 26, so that the torsion bar 7 is further twisted. As the force exerted on the arcuate inward protrusion 26e exceeds the limited load Fs3 of the arcuate inward protrusion 26e, the arcuate inward protrusion 26e is sheared at its root. At this point, the entire limited load reaches the sum of the limited load FS3 of the arcuate inward protrusion 26d and the limited load FTB of the torsion bar 7. By the shearing of the arcuate inward protrusion 26e, the impact applied to the occupant is absorbed, followed by the absorption by the shearing of the arcuate inward protrusion 26d, the absorbing amount being smaller than the absorbing amount by the arcuate inward protrusion 26d.

After the arcuate inward protrusion 26e, the final one, is sheared, the limited load is rapidly decreased from the limited load FS3+FTB as shown in FIG. 5(*b*). After this, the reel 4' rotates in the webbing unwinding direction with twisting the torsion bar 7. By this twisting of the torsion bar 7, the load applied to the webbing 3 is limited, thus gently absorbing the impact on the occupant. Thus, the limited load becomes equal to the limited load FTB of the torsion bar 7 and becomes substantially constant.

The other operations of the seat belt retractor 1 of this embodiment are the same as those of the seat belt retractor 1 of the aforementioned embodiment.

As mentioned above, the seat belt retractor 1 of this embodiment has limited load characteristics capable of providing four kinds of limited loads, that is, the impact energy of the occupant can be absorbed in four stages, thereby further effectively absorbing the impact energy as compared to the seat belt retractor 1 of the aforementioned embodiment.

The other functions of the seat belt retractor 1 of this embodiment are the same as those of the seat belt retractor 1 of the aforementioned embodiment.

In the seat belt retractor 1 of this embodiment, by suitably changing the arrangement of the arcuate inward protrusions 26c, 26d, 26e, the limited load characteristics can be varied. For example, by inverting the order of the arrangement of the arcuate inward protrusions 26c, 26d, 26e, the limited load characteristics inverse to the limited load characteristics shown in FIG. 5(*b*) can be obtained as shown in FIG. 5(*c*).

Further, by using the arrangement of the arcuate inner protrusions 26c, 26d, 26e having limited load characteristics shown in FIG. 5(*b*) and setting, in the same manner as shown by two-dot chain line in FIG. 5(*a*), such that the side wall 4g1 of the arcuate recess 4g comes to contact the arcuate inner protrusion 26c after the torsion bar 7 is twisted to some extent at first, limited load characteristics shown in FIG. 5(*d*) can be obtained.

By inverting the order of the arrangement of the two arcuate inner protrusions 26c, 26d among the order of the arrangement of the arcuate inner protrusions 26c, 26d, 26e having the limited load characteristics shown in FIG. 5(*c*), limited load characteristics shown in FIG. 5(*e*) can be obtained.

Furthermore, by inverting the order of the arrangement of the two arcuate inner protrusions 26d, 26e among the order of the arrangement of the arcuate inner protrusions 26c, 26d, 26e having the limited load characteristics shown in FIG. 5(*b*), limited load characteristics shown in FIG. 5(*f*) can be obtained.

Further, by using the arrangement of the arcuate inner protrusions 26c, 26d, 26e having the limited load characteristics shown in FIG. 5(*b*) and setting such that the side wall 4g1 of the arcuate recess 4g does not come to contact the arcuate inner protrusion 26d at the same time of shearing of the first arcuate inner protrusion 26c and comes to contact the arcuate inner protrusion 26d after the torsion bar 7 is twisted to some extent after the shearing of the first arcuate inner protrusion 26c, limited load characteristics shown in FIG. 5(g) can be obtained.

As mentioned above, by suitably changing the arrangement of the arcuate inner protrusions 26c, 26d, 26e, the order of the respective limited loads FS1, FS2, FS3 of the arcuate inner protrusions 26c, 26d, 26e and the timing of the limited loads FS1, FS2, FS3 can be freely set so as to obtain various limited load characteristics.

In addition, various limit load characteristics can be obtained by methods other than changing the arrangement of the arcuate inner protrusions 26c, 26d, 26e. For example, by suitably changing the circumferential lengths $\beta$, $\gamma$, $\delta$ of the roots of the arcuate inner protrusions 26c, 26d, 26e, changing the distances $\epsilon$, $\xi$, and/or changing the material or thickness of the shear plate 26, not only the order of the respective limited loads FS1, FS2, FS3 and the timing of the limited loads FS1, FS2, FS3 but also the magnitudes of the respective limited loads FS1, FS2, FS3 can be freely set so as to obtain various limited load characteristics.

Figure 8A:
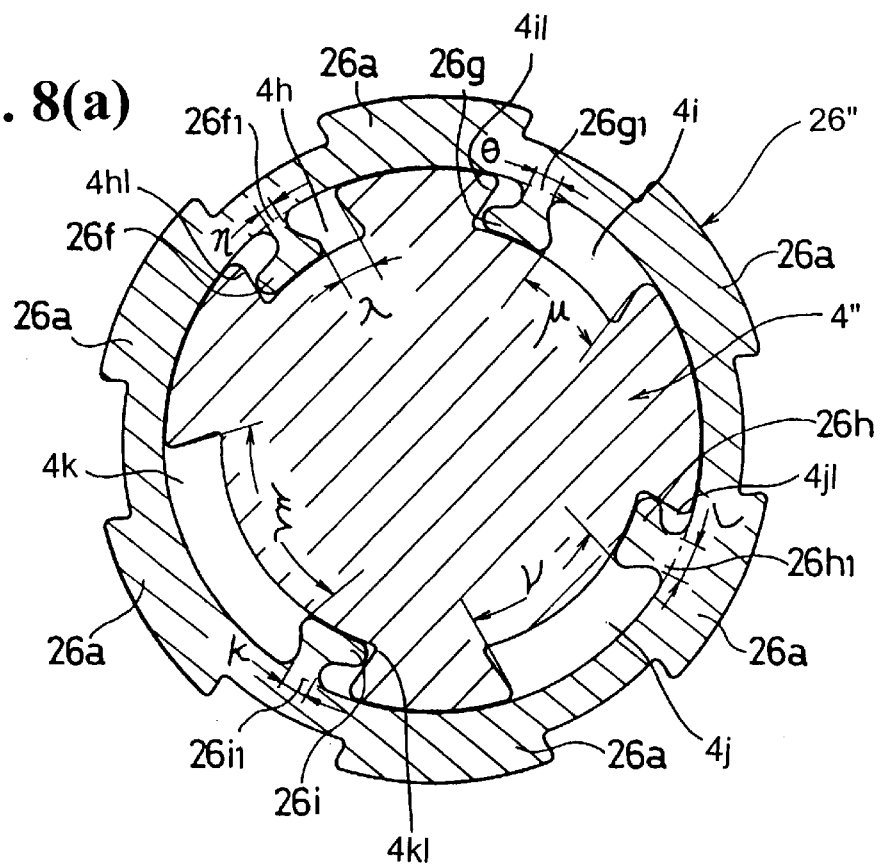
FIGS. 8(a) and 8(b) are views showing further different embodiments of a shear plate and a reel employed in the seat belt retractor according to the present invention.
Figure 8B:
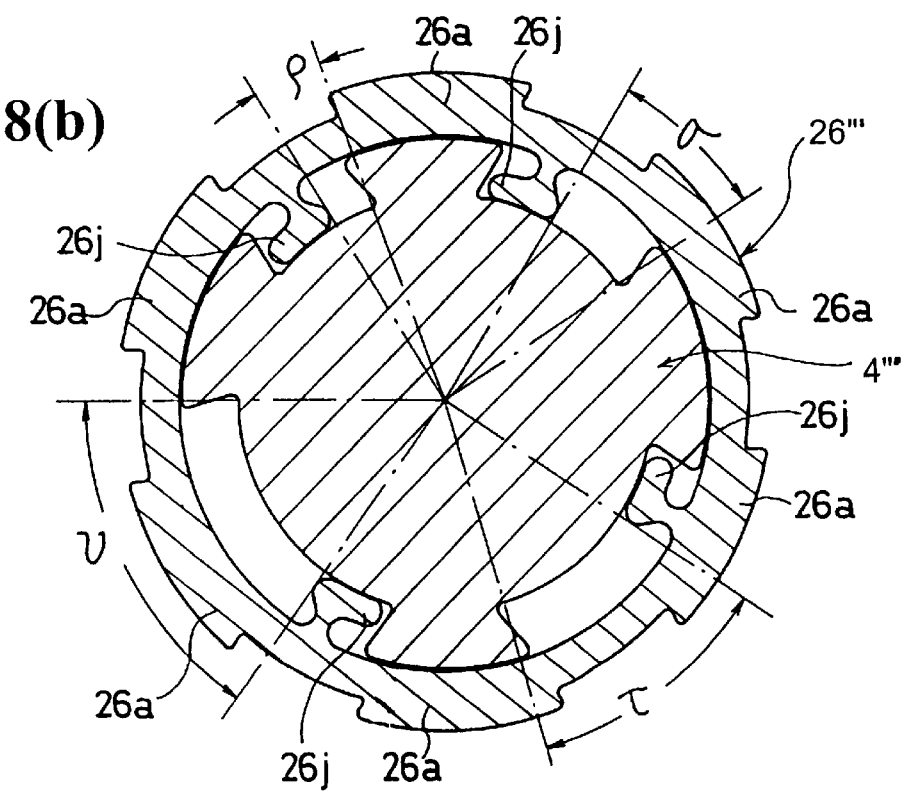

FIG. 8(a) and FIG. 8(b) are views each showing a shear plate and a reel 4 employed in a seat belt retractor of a further embodiment of the present invention.

Though three arcuate inner protrusions are formed in the shear plates 26, 26' in the aforementioned embodiments, four arcuate inner protrusions 26f, 26g, 26h, 26i having different sizes are formed in the shear plate 26" in the embodiments shown in FIG. 8(a) and FIG. 8(b).

In this case, in the embodiment shown in FIG. 8(a), the circumferential lengths of the respective roots 26f1, 26g1, 26h1, 26i1 of the arcuate inward protrusions 26f, 26g, 26h, 26i are set as the circumferential length $\iota$ of the root 26h1>the circumferential length $\theta$ of the root 26g1>the circumferential length $\kappa$ of the root 26i1>the circumferential length $\eta$ of the root 26f1. Accordingly, the respective limited loads FS4, FS5, FS6, FS7 of the arcuate inward protrusions 26f, 26g, 26h, 26i are set as FS6>FS5>FS7>FS4.

On the other hand, four arcuate recesses 4h, 4i, 4j, 4k are formed in the reel 4" to correspond to the arcuate inward protrusions 26f, 26g, 26h, 26i. The distances $\lambda$, $\mu$, $\nu$, $\xi$ between the respective side walls 4h1, 4i1, 4j1, 4k1 of the arcuate recesses 4h, 4i, 4j, 4k and the arcuate inward protrusions 26f, 26g, 26h, 26i are defined by the circumferential lengths of the arcuate recesses 4h, 4i, 4j, 4k and are set as $\xi>\nu>\mu>\lambda$. That is, in this embodiment, the arcuate inner protrusion 26f, to which the force is exerted by the reel 4" in the webbing unwinding direction at first, is spaced apart from the side wall 4h1 of the corresponding arcuate recess 4h at a distance $\lambda$. By the first distance $\lambda$, the load is stabilized because the arcuate inner protrusion 26f is not deformed during the rising in the load until the twisting of the torsion bar 7 is started. The other structure of the seat belt retractor 1 of this embodiment is the same as that of the seat belt retractor 1 of the aforementioned embodiments.

Figure 9A:
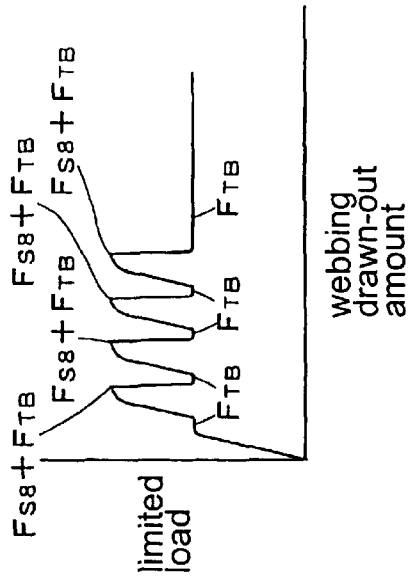
FIGS. 9(a) and 9(b) are graphs showing limited load characteristics of the seat belt retractors shown in FIGS. 8(a) and 8(b), respectively.

Accordingly, in this embodiment, the rotation of the pawl holder 14 is stopped in the event of emergency just like the aforementioned embodiments. When the reel 4" is subjected to the impact load applied to the webbing 3 by the inertia of the occupant in the webbing unwinding direction, this force (impact load) first acts on only the torsion bar 7 because the arcuate inner protrusion 26f is spaced apart from the side wall 4h1 of the arcuate recess 4h. As the torsion bar 7 starts to be twisted, the impact energy applied to the occupant is relatively gently absorbed by the limited load FTB of the torsion bar 7 at first as shown in FIG. 9(a). As the side wall 4h1 of the arcuate recess 4h comes to contact the arcuate inward protrusion 26f, the force by the reel 4" in the webbing unwinding direction also acts on the arcuate inner protrusion 26f, so that the limited load is increased as shown in FIG. 9(a). Then, the arcuate inner protrusion 26f is sheared at its root 26f1, thereby relatively greatly absorbing the impact energy applied to the occupant. After the arcuate inner protrusion 26f is sheared, the limited load is rapidly decreased from the peak as shown in FIG. 9(a).

At this point, the side wall 4i1 of the arcuate recess 4i does not still contact the arcuate inner protrusion 26g. The side wall 4i1 of the arcuate recess 4i does not come to contact the arcuate inner protrusion 26g until the limited load becomes the limited load FTB of the torsion bar 7. That is, the side wall 4i1 of the arcuate recess 4i comes to contact the arcuate inner protrusion 26g after the limited load becomes the limited load FTB of the torsion bar 7. As the side wall 4i1 of the arcuate recess 4i comes to contact the arcuate inner protrusion 26g, the arcuate inner protrusion 26g is plastically deformed, so that the limited load is increased again as shown in FIG. 9(a). At this point, the limited load is greater than the limited load at the time of shearing the arcuate inner protrusion 26f because the limited loads FS4, FS5 of the arcuate inner protrusion 26f, 26g are set as FS5>FS4. As the arcuate inner protrusion 26g is sheared at its root 26g1, the limited load is rapidly decreased from the peak to the limited load FTB of the torsion bar 7 as shown in FIG. 9(a). After that, in the same manner, the other arcuate inner protrusions 26h, 26i are sequentially deformed and sheared with twisting the torsion bar 7, thereby obtaining the limited load shown in FIG. 9(a).

The other functions and effects of the seat belt retractor 1 of this embodiment are the same as those of the seat belt retractor 1 of the aforementioned embodiments.

On the other hand, in the embodiment shown in FIG. 8(b), the four arcuate inner protrusions 26j are formed to have the same size so that the respective limited loads FS8 of these protrusions 26j of the shear plate 26''' are equal to each other.

Though the distances $\lambda$, $\mu$, $\nu$, $\xi$ are defined by the circumferential lengths in the embodiment shown in FIG. 8(a), the distances $\rho$, $\sigma$, $\tau$, $\upsilon$ are defined by rotational angles of the reel 4''' and are set as $\upsilon>\tau>\sigma>\rho$. The limited load of this embodiment is shown in FIG. 9(b).

The other functions and effects of the seat belt retractor 1 of this embodiment shown in FIG. 8(b) are the same as those of the seat belt retractor 1 of the aforementioned embodiment shown in FIG. 8(a).

Figure 9B:
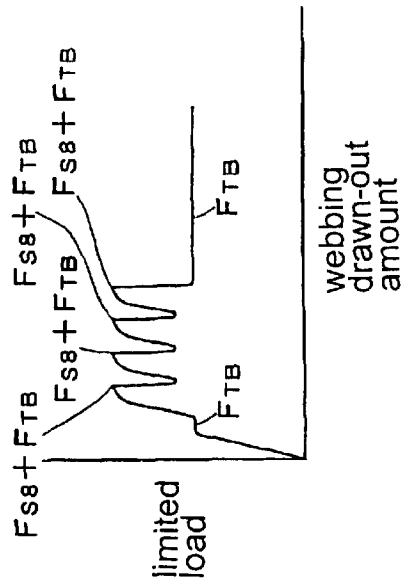

In the embodiments shown in FIG. 8(a) and 8(b), the distances $\lambda$, $\mu$, $\nu$, $\xi$ and $\rho$, $\sigma$, $\tau$, $\upsilon$ are set to have the webbing withdrawn amount—limited load characteristics shown in FIGS. 9(a) and 9(b), respectively. That is, the limited load of the seat belt retractor is decreased to the limited load FTB of the torsion bar 7 after one of the arcuate inner protrusions is sheared, and after that, the side wall 4g1 of the recess 4g of the reel 4", 4''' comes to contact the next one of the arcuate inner protrusions. However, the distances $\lambda$, $\mu$, $\nu$, $\xi$ and $\rho$, $\sigma$, $\tau$, $\upsilon$ may be set so that the side wall 4g1 of the arcuate recess 4g of the reel 4", 4''' comes to contact the next one of the arcuate inner protrusions before the limited load of the seat belt retractor is decreased to the limited load FTB of the torsion bar 7 after the first one of the arcuate inner protrusions is sheared.

Figure 9C:
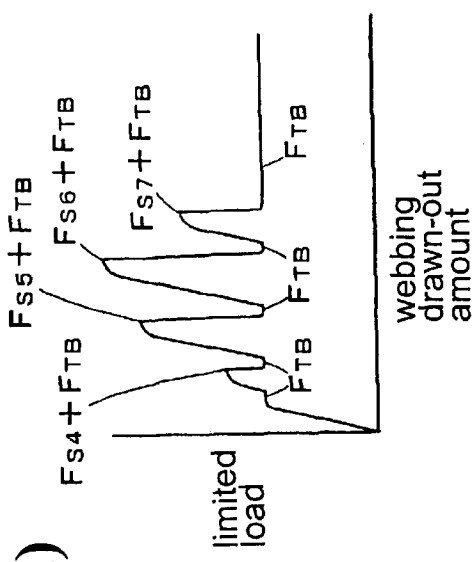
FIGS. 9(c) and 9(d) are graphs showing further variations of the limited load characteristics of the seat belt retractors.
Figure 9D:
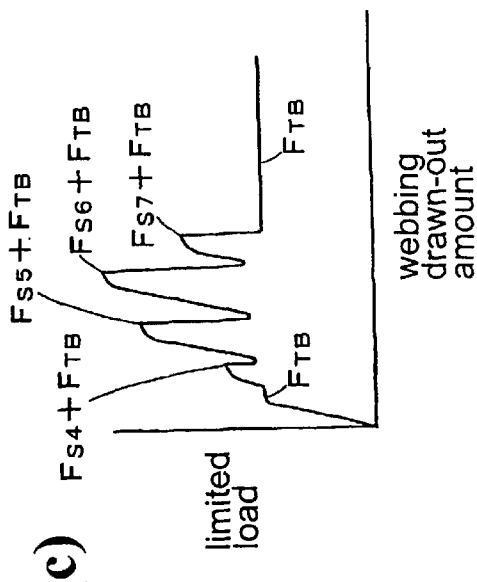

The webbing withdrawn amount—limited load characteristics at this point are shown in FIG. 9(c) (corresponding to the shear plate 26″ shown in FIG. 8(*a*)) and FIG. 9(*d*) (corresponding to the shear plate 26‴ shown in FIG. 8(*b*). In the characteristics shown in FIG. 9(*c*), the decreased value of the limited load of the seat belt retractor just after the arcuate inner protrusion is sheared differs for every shearing of the arcuate inner protrusions. In the characteristics shown in FIG. 9(*d*), the decreased amount in the limited load of the seat belt retractor just after the arcuate inner protrusion is sheared is set so that the respective decreased amounts are equal to each other. The decreased value of the limited load can be set in the order of gradually increasing, in the order of gradually decreasing, or in random order.

Though three or four arcuate inner protrusions are disposed in the aforementioned embodiments, the present invention is not limited thereto. The number of the arcuate inner protrusions may be any number equal to or more than one to thereby provide various limited load characteristics. In this case, some arcuate inner protrusions may be set to have one size and other some arcuate inner protrusions may be set to have another size different from the above size.

Instead of the narrow portion at the root of each arcuate inner protrusion, the arcuate inner protrusion may be formed with a predetermined number of holes along an arcuate line shown by two-dot chain line shown in FIG. 3 and FIG. 6, or formed with an arcuate groove or notch formed along the two-dot chain line. Alternatively, a combination among narrow portion, holes, groove, and notch may also be employed. Further, according to the present invention, the narrow portion, the holes, the groove and the notch are not necessarily formed and may be omitted.

Furthermore, the circumferential shearing portion may be composed of arcuate outer protrusions. In this case, arcuate inner protrusions must be set not to be sheared.

As apparent from the above description, the seat belt retractor of the first aspect has limited load characteristics for providing two kinds of limited loads, i.e. limited load by a circumferential shearing portion of a shear plate and limited load by a webbing load limiting means, thereby further effectively absorbing impact load exerted on a vehicle occupant as compared to the conventional seat belt retractor having the limited load characteristics providing one kind of flat limited load.

Especially, the respective timings of two kinds of limited loads can be freely set by setting such that the action of the circumferential shearing portion is conducted in a period between the time when the locking member is stopped in its rotation in the webbing unwinding direction and the time when a reel is stopped in its rotation in the webbing unwinding direction relative to the locking member.

In addition, the seat belt retractor of the second aspect has multi-stage limited load characteristics providing plural kinds of limited loads, i.e. limited loads by a predetermined number of circumferential shearing portions of a shear member, and limit load by a webbing load limiting means, thereby further effectively absorbing impact load exerted on a vehicle occupant as compared to the conventional seat belt retractor having limited load characteristics providing one kind of flat limited load.

Especially, the respective timings of the various kinds of limited loads can be freely set by setting such that the actions of the predetermined number of the circumferential shearing portions are conducted in a period between the time when the locking member is stopped in its rotation in the webbing unwinding direction and the time when the reel is stopped in its rotation in the webbing unwinding direction relative to the locking member.

According to other aspects, the above effects can be obtained just by interposing the ring-like shear plate which can be easily configured and processed between the reel and the locking member. Therefore, the assembly is easy and the cost is low.

While the present invention has been explained with reference to the specific embodiments of the invention, the explanation is illustrative, and the invention is limited only by the appended claims.

What is claimed is:

1. A seat belt retractor comprising;

a reel for winding a webbing;

locking means having a locking member for stopping rotation of the reel in a webbing unwinding direction in an emergency; and webbing load limiting means for rotationally connecting the reel and the locking member and disposed at least partly in the reel coaxially therewith, said webbing load limiting means limiting a load exerted on the webbing when rotation of the locking member is stopped in the webbing unwinding direction and the reel rotates for a predetermined amount in the webbing unwinding direction relative to the locking member, said webbing load limiting means including a shear member disposed between the reel and the locking member and having a plurality of circumferential shearing portions extending in a circumferential direction at predetermined intervals therebetween, said circumferential shearing portions preventing the reel from rotating relative to the locking member when an exerted shearing load is less than a preset shearing load, and being plastically deformed and sheared to allow the reel to rotate relative to the locking member when the exerted shearing load exceeds the preset shearing load, in a period between a time when the rotation of the locking member is stopped in the webbing unwinding direction and a time when the rotation of the reel is stopped in the webbing unwinding direction relative to the locking member, each of said circumferential shearing portions being sheared when each exerted shearing load exceeds each preset shearing load, said circumferential shearing portions being structured to be sequentially sheared such that at least one of the circumferential shearing portions is sheared to rotate the reel relative to the locking member, and after that, at least one of the remainder of the circumferential shearing portions is sheared.

2. A seat belt retractor according to claim 1, wherein said shear member is an annular shear plate sandwiched between the reel and the locking member.

3. A seat belt retractor according to claim 1, wherein said webbing load limiting means further includes a torsion member disposed between the reel and the locking member, said torsion member cooperating with the shear member to absorb the load applied to the webbing.

4. A seat belt retractor according to claim 3, wherein said torsion member is a torsion bar situated inside the reel and connected to the shear member through the locking member.

5. A seat belt retractor according to claim 1, wherein the preset shearing loads of the circumferential shearing portions are set to be different from each other.

6. A seat belt retractor according to claim 1, wherein the preset shearing loads of the circumferential shearing portions are set such that at least some of the preset shearing loads are equal to each other.

7. A seat belt retractor according to claim 1, wherein said shear member is composed of an annular shear plate.

8. A seat belt retractor comprising:

a reel for winding a webbing;

locking means having a locking member for stopping rotation of the reel in a webbing unwinding direction in an emergency; and webbing load limiting means for rotationally connecting the reel and the locking member and disposed at least partly in the reel coaxially therewith, said webbing load limiting means limiting a load exerted on the webbing when rotation of the locking member is stopped in the webbing unwinding direction and the reel rotates for a predetermined amount in the webbing unwinding direction relative to the locking member, said webbing load limiting means including a shear member disposed between the reel and the locking member and having at least one circumferential shearing portion extending in a circumferential direction, said circumferential shearing portion preventing the reel from rotating relative to the locking member when an exerted shearing load is less than a preset shearing load, and being plastically deformed and sheared to allow the reel to rotate relative to the locking member when the exerted shearing load exceeds the preset shearing load, in a period between a time when the rotation of the locking member is stopped in the webbing unwinding direction and a time when the rotation of the reel is stopped in the webbing unwinding direction relative to the locking member;

wherein said shear member is an annular plate including at least one arcuate outward protrusion which is formed around an outer periphery thereof to protrude outwardly in a radial direction and to extend in the circumferential direction, and at least one arcuate inward protrusion which is formed around an inner periphery thereof to protrude inwardly in the radial direction and to extend in the circumferential direction, one of the arcuate outward protrusion and the arcuate inward protrusion forming said circumferential shearing portion; and said reel includes in a circumferential direction thereof a recess in which one of said arcuate outward protrusion and said arcuate inward protrusion is fitted to engage therewith, said locking member being engageable with the other of said arcuate outward protrusion and said arcuate inward protrusion.

9. A seat belt retractor according to claim 8, wherein said reel includes a plurality of recesses, said recesses having different lengths in the circumference direction with each other.

10. A seat belt retractor comprising;

a reel for winding a webbing;

locking means having a locking member for stopping rotation of the reel in a webbing unwinding direction in an emergency; and webbing load limiting means for rotationally connecting the reel and the locking member and disposed at least partly in the reel coaxially therewith, said webbing load limiting means limiting a load exerted on the webbing when rotation of the locking member is stopped in the webbing unwinding direction and the reel rotates for a predetermined amount in the webbing unwinding direction relative to the locking member, said webbing load limiting means including a shear member disposed between the reel and the locking member and having plurality of circumferential shearing portions extending in a circumferential direction at predetermined intervals therebetween, said circumferential shearing portions preventing the reel from rotating relative to the locking member when an exerted shearing load is less than a preset shearing load, and being plastically deformed and sheared to allow the reel to rotate relative to the locking member when the exerted shearing load exceeds the preset shearing load, in a period between a time when the rotation of the locking member is stopped in the webbing unwinding direction and a time when the rotation of the reel is stopped in the webbing unwinding direction relative to the locking member, each of said circumferential shearing portions being sheared when each exerted shearing load exceeds each preset shearing load, said circumferential shearing portions having bottom portions where shearing occurs, said bottom portions having different lengths in the circumference direction with each other.

* * * * *